United States Patent
Lee et al.

(10) Patent No.: US 10,032,231 B2
(45) Date of Patent: Jul. 24, 2018

(54) INFERRED MATCHING OF PAYMENT CARD ACCOUNTS BY MATCHING TO COMMON MOBILE DEVICE VIA TIME AND LOCATION DATA ANALYSIS

(71) Applicant: MasterCard International Incorporated, Purchase, NY (US)

(72) Inventors: Edward Lee, Scarsdale, NY (US); Luckner B. Polycarpe, Brooklyn, NY (US); Kent Olof Niklas Berntsson, Rye, NY (US)

(73) Assignee: Mastercard International Incorporated, Purchase, NY (US)

(*) Notice: Subject to any disclaimer, the term of this patent is extended or adjusted under 35 U.S.C. 154(b) by 505 days.

(21) Appl. No.: 14/521,814

(22) Filed: Oct. 23, 2014

(65) Prior Publication Data

US 2016/0117781 A1    Apr. 28, 2016

(51) Int. Cl.
*G06Q 30/00* (2012.01)
*G06Q 40/00* (2012.01)
*G06Q 30/02* (2012.01)

(52) U.S. Cl.
CPC ......... *G06Q 40/12* (2013.12); *G06Q 30/0269* (2013.01)

(58) Field of Classification Search
CPC .................................................. G06Q 30/0269

USPC ............................................. 705/14.66, 30, 37
See application file for complete search history.

(56) References Cited

U.S. PATENT DOCUMENTS

| | | | |
|---|---|---|---|
| 6,018,723 A * | 1/2000 | Siegel | G06Q 20/10 705/44 |
| 8,306,986 B2 | 11/2012 | Routson et al. | |
| 2011/0246306 A1* | 10/2011 | Blackhurst | G06Q 30/02 705/14.58 |
| 2013/0290119 A1 | 10/2013 | Howe et al. | |
| 2014/0129596 A1 | 5/2014 | Howe | |
| 2015/0269580 A1* | 9/2015 | Subramanian | G06Q 20/4016 705/44 |
| 2016/0071115 A1* | 3/2016 | Oh | G06Q 20/202 705/7.29 |

* cited by examiner

*Primary Examiner* — A Hunter Wilder
(74) *Attorney, Agent, or Firm* — Buckley, Maschoff & Talwalkar, LLC

(57) ABSTRACT

Payment card account transaction data sets and mobile device travel profiles are compared with each other to detect matches in terms of times and locations of use and/or presence. Such an analysis may link two or more payment card accounts to the same mobile device. Consequently, common ownership of the two or more payment card accounts may be reasonably inferred. Based on the inference of common ownership, marketing related analysis may be performed on a combined transaction data set that reflects transactions in both commonly owned payment card accounts.

21 Claims, 5 Drawing Sheets

INFERRED MATCHING OF PAYMENT CARD ACCOUNTS BY MATCHING TO COMMON MOBILE DEVICE VIA TIME AND LOCATION DATA ANALYSIS

BACKGROUND

In U.S. Published Patent Application No. 2013/0290119 (which names Howe et al. as inventors and which is commonly assigned herewith), it was proposed to use time and location data associated with payment card accounts with time and location data associated with cell phones to infer connections between the payment card accounts and the users of the cell phones. A stated reason for this analysis is to further a payment transaction security strategy based on detecting when a corresponding cell phone was not in proximity to a location of a current payment card account transaction.

The present inventors have now recognized that inferred matching from payment card accounts to mobile devices may also present novel opportunities to enhance analysis of data generated in past payment card account transactions.

BRIEF DESCRIPTION OF THE DRAWINGS

Features and advantages of some embodiments of the present disclosure, and the manner in which the same are accomplished, will become more readily apparent upon consideration of the following detailed description of the disclosure taken in conjunction with the accompanying drawings, which illustrate preferred and exemplary embodiments and which are not necessarily drawn to scale, wherein.

DETAILED DESCRIPTION

Embodiments of the present disclosure relate to systems and methods for analyzing transaction data and data indicative of individuals' locations at various times. More particularly, embodiments relate to systems and methods for comparing mobile device travel profiles with transaction profiles for individual holders of payment card accounts, in order to potentially match transaction profiles with mobile device travel profiles. It may further be determined that two or more payment card accounts can be matched to a single mobile device travel profile with sufficient confidence to justify an inference that the latter payment card accounts are commonly owned. Consequently, meaningful data analyses can be performed on a combined basis for the transaction data for the commonly owned payment card accounts.

The term "mobile device travel profile" refers to a set of data that reflects locations at which a cell phone or other mobile device was present at various points of time in the past.

The terms "de-identified data" or "de-identified data sets" are used to refer to data or data sets which have been processed or filtered to remove any personally identifiable information ("PII"). The de-identification may be performed in any of a number of ways, although in some embodiments, the de-identified data may be generated using a filtering process which removes PII and associates a de-identified unique identifier (or de-identified unique "ID") with each record (as will be described further below).

The term "payment card network" or "payment network" is used to refer to a payment network or payment system such as the systems operated by MasterCard International Incorporated (which is the assignee hereof), or other networks which process payment transactions on behalf of a number of merchants, issuers and cardholders. The terms "payment card network data" or "network transaction data" are used to refer to transaction data associated with payment transactions that have been processed over a payment network. For example, network transaction data may include a number of data records associated with individual payment transactions that have been processed over a payment card network. In some embodiments, network transaction data may include information identifying a payment device or account, transaction date and time, transaction amount, and information identifying a merchant or merchant category, and a location at which the transaction occurred. Additional transaction details may be available in some embodiments.

Figure 1:
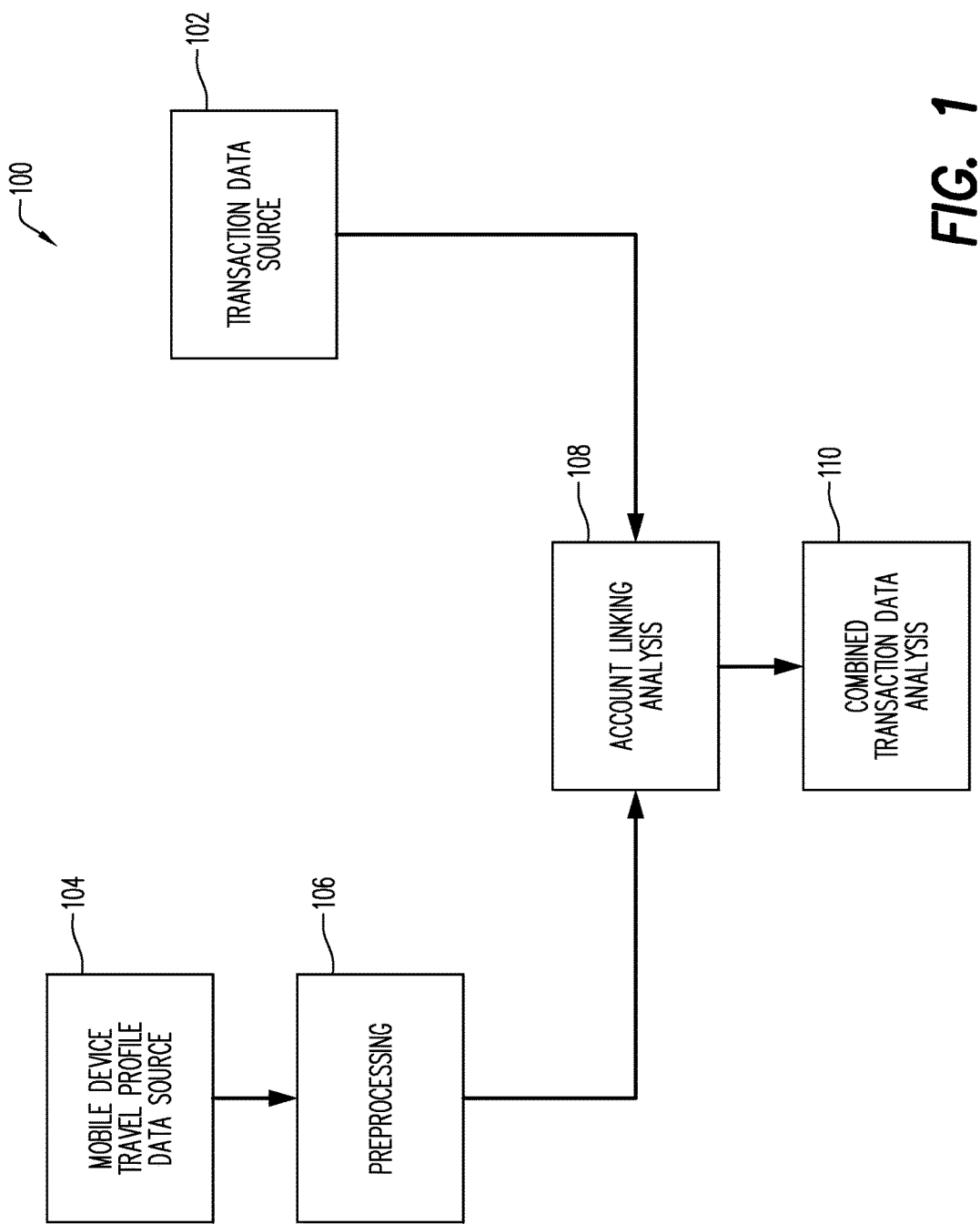
FIG. 1 is a functional block diagram that illustrates a system provided in accordance with aspects of the present disclosure.

FIG. 1 is a functional block diagram that illustrates a data analysis system 100 provided in accordance with aspects of the present disclosure.

The data analysis system 100 may include a source 102 of network transaction data produced in and stored by a conventional payment network (not shown) in connection with payment card account transactions handled by the payment network. The transaction data may be in the form of transaction profiles, or may be processed so as to be in that form. Each transaction profile may represent transactions performed using a particular payment card account.

Also shown in FIG. 1 is a source 104 of mobile device travel profile data. The mobile device travel profile data may be in the form of data sets, and each of those data sets may include or consist of a travel profile for a particular mobile device. For each such mobile device, the respective travel profile may represent movements of the mobile device from one location to another over time. The mobile device travel profile data may be generated by one or more of the following: (1) device tracking by mobile network operators; (2) data uploaded from GPS (global positioning system) applications in mobile devices; (3) location data generated in connection with social network applications; and (4) data captured in connection with other location-sensitive services, such as Foursquare® and Yelp®. Each of the profiles may include a number of data pairs, each of which includes a geographic data element (that indicates a geographic location) and a temporal data element (that indicates a date and/or time when the mobile device in question was at the geographic location represented by the geographic data element).

Block 106 in FIG. 1 represents a processing block in which the mobile device travel profile data from source 104 may be preprocessed to be placed in a format suitable for subsequent analysis/comparison with the transaction data.

Block 108 in FIG. 1 represents a processing block that may perform an analysis for linking two or more payment card accounts to each other via matching to a common mobile device. Analysis block 108 may be in data communication with the transaction data source 102 and with the preprocessing block 106.

Also shown in FIG. 1 is a combined transaction data analysis block 110. This block 110 may be in data communication with the analysis block 108 and may operate to perform analyses of transaction data that has been combined from two or more linked payment card accounts.

Features of some embodiments of the present disclosure will now be described with reference to FIG. 2, where block diagram portions of the data analysis system 100 are shown. The data analysis system 100 may be operated by or on behalf of an entity that provides data analysis services. For example, in some embodiments, the data analysis system 100 may be operated by or on behalf of a payment network or association (e.g., such as MasterCard International Incorporated).

The data analysis system 100 includes a matching/probabilistic engine 202 to provide matching of payment card account data sets to mobile device travel profiles and to assign confidence scores to the matches. In some embodiments, the matching/probabilistic engine 202 receives or analyzes data from two or more data sources, including transaction data 204 (which may come from the transaction data source 102 shown in FIG. 1) and mobile device travel profile data 206 (FIG. 2; such data may come from the source 104 shown in FIG. 1). In some embodiments, the data to be analyzed by the matching/probabilistic engine 202 may be pre-processed. For example, at block 208, the mobile device travel profile data 206 may be anonymized by removing any PII therefrom. Instead of the PII, the anonymized location/time data may instead include a de-identified unique identifier code that may be generated in any convenient manner by the anonymizing block 208. Consequently, the mobile device travel profile data as provided to the matching/probabilistic engine 202 may be de-identified data. The anonymizing block 208 may generate a lookup table 210 to link the de-identified unique identifier for each location and time profile to the corresponding PII that was associated with the profile before it was anonymized. In some embodiments, the anonymization of the mobile device travel profile data may occur before it is delivered to the entity that operates the matching/probabilistic engine 202.

Furthermore, at block 212, the transaction data 204 may be anonymized by removing any PII therefrom. For example, the anonymizing block 212 may substitute a de-identified unique identifier code for the PII that was associated with each transaction profile before anonymization. In some embodiments the PII may be a PAN (primary account number) for the corresponding payment card account and the de-identified unique identifier code may be generated by applying a function to the PAN. The function may be, for example, a hash function or the like. The anonymizing block 212 may generate a lookup table 214 to link the de-identified unique identifier for each transaction profile to the PAN or other PII originally associated with the transaction profile before it was anonymized. Consequently, in some embodiments, the transaction data as provided to the matching/probabilistic engine 202 may be de-identified data.

At block 216, the mobile device travel profile data may be pre-processed to place it in a correct format for the matching/probabilistic engine 202 and/or to remove unnecessary data elements.

In some embodiments, the matching/probabilistic engine 202 may operate to perform an inferred match analysis to assess an inferred linkage between the mobile device travel profile data and the transaction data. The inferred match analysis may be based in part on the portion of the transaction data that indicates the dates/times/locations of the transactions.

As used herein, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. In addition, entire modules, or portions thereof, may also be implemented in programmable hardware devices such as field programmable gate arrays, programmable array logic, programmable logic devices or the like or as hardwired integrated circuits.

Figure 2:
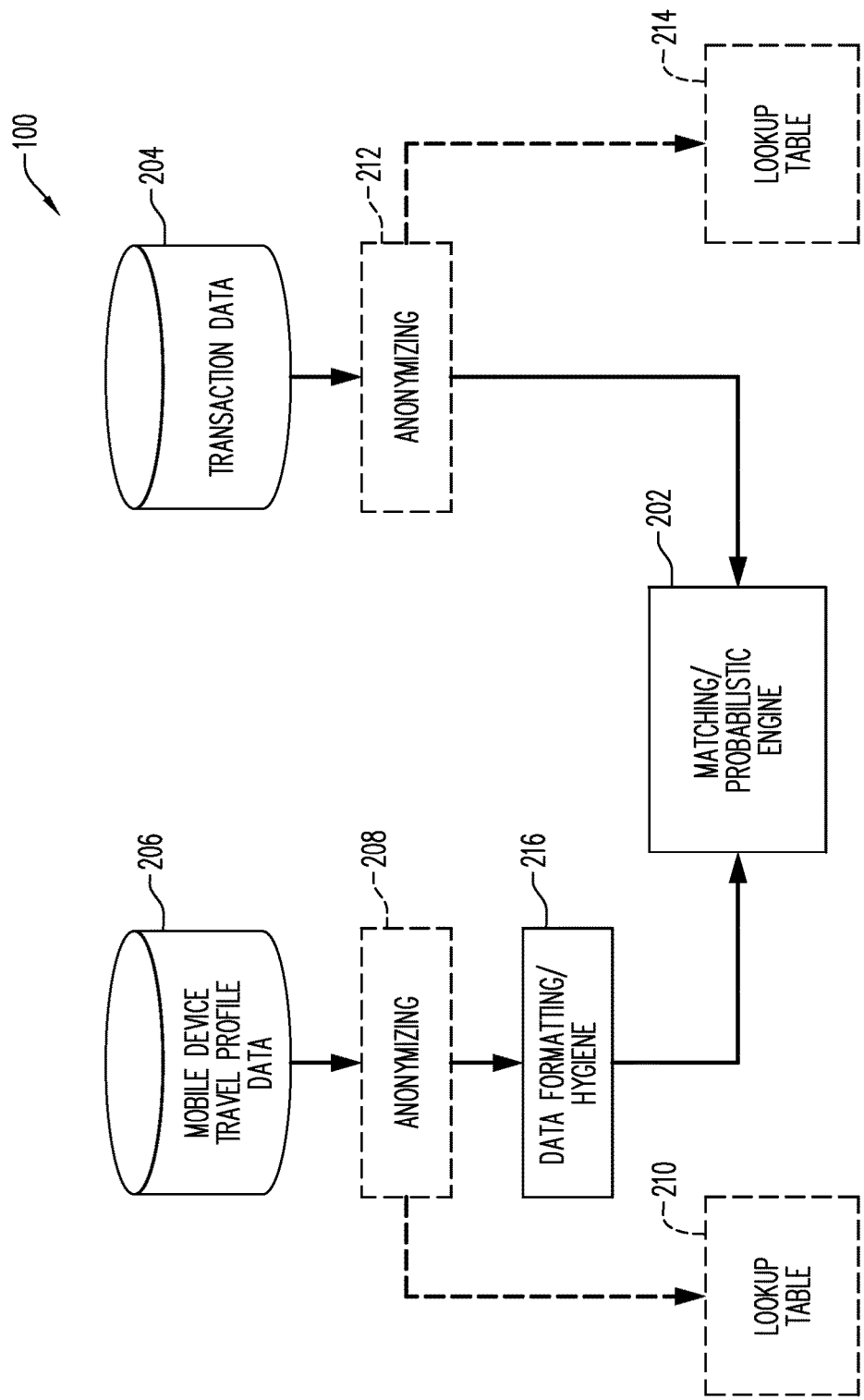
FIG. 2 shows a system architecture within which some embodiments may be implemented.

In some embodiments, the modules of FIG. 1 and FIG. 2 are software modules operating on one or more computers. In some embodiments, control of the input, execution and outputs of some or all of the modules may be via a user interface module (not shown) which includes a thin or thick client application in addition to, or instead of a web browser.

The matching/probabilistic engine 202 may be operated to establish a linkage between the mobile device travel profile data and the transaction data. In some embodiments, the linkage may be a probability score or other scoring measure that indicates, as between a mobile device travel profile and a transaction profile how likely it is that the two profiles correspond to the same individual. Examples of suitable analytic techniques will be discussed below in connection with FIG. 4. The matching/probabilistic engine 202 may operate to match the mobile device travel profiles with the transaction profiles with some level of probability, or degree of confidence. The level of probability may also be referred to as "the pattern match." The pattern match could range from 0 to 1 (i.e., from 0% to 100%). An alternative manner of scoring and indicating the likelihood of matching may also be employed.

Figure 3:
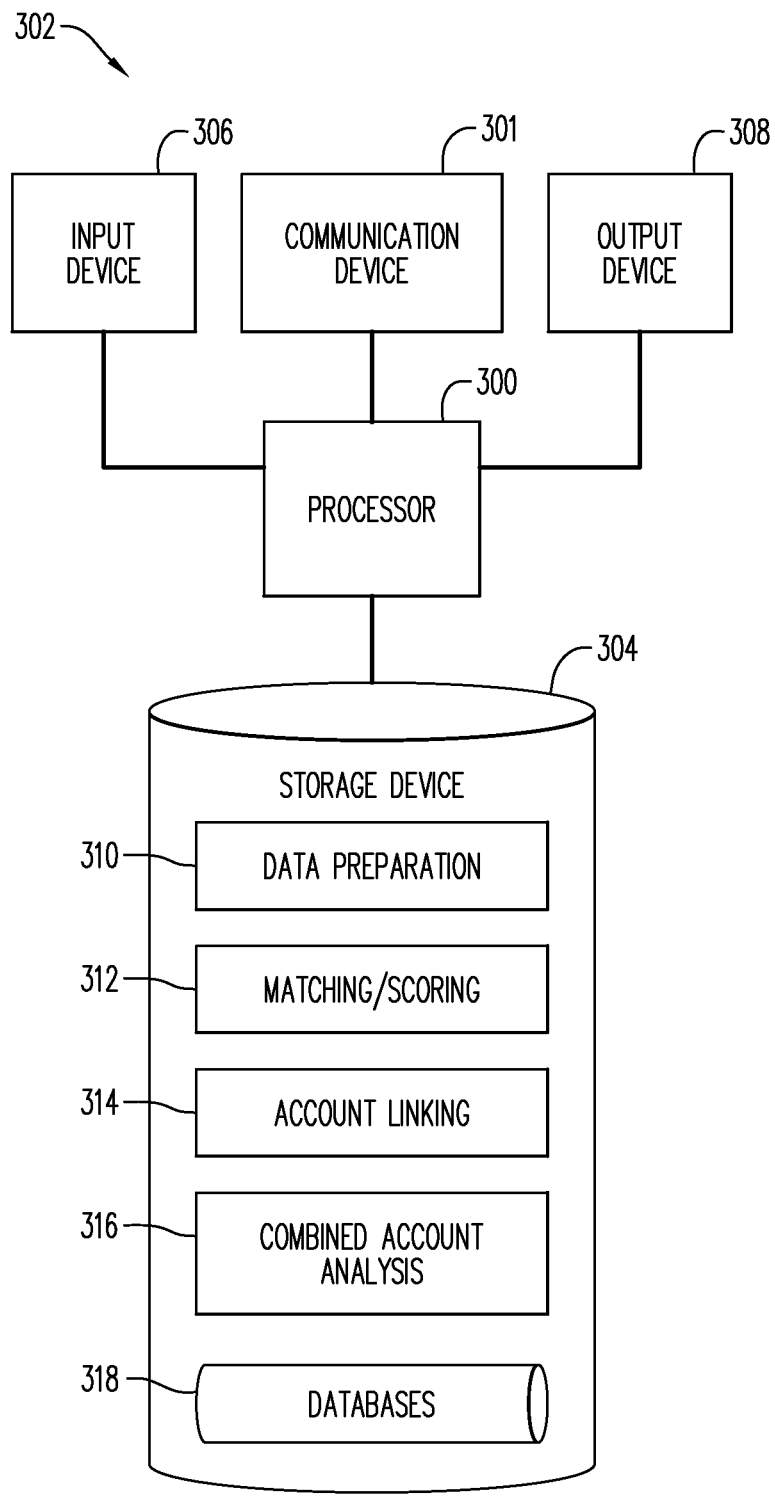
FIG. 3 is a block diagram that illustrates a computer system that may provide functionality within the system of FIGS. 1 and 2.

FIG. 3 is a block diagram representation of a computer system 302 that may be operated in accordance with aspects of the disclosure to provide at least some of the functionality described herein.

The computer system 302 may be conventional in its hardware aspects but may be controlled by software to cause it to function as described herein. In some embodiments, functionality disclosed herein may be distributed among two or more computers having a hardware architecture similar to that described below. In some embodiments, the computer system 302 may be constituted in its hardware aspects by one or more mainframe or server computers.

The computer system 302 may include a computer processor 300 operatively coupled to a communication device 301, a storage device 304, an input device 306 and an output device 308.

The computer processor 300 may be constituted by one or more conventional processors. Processor 300 operates to execute processor-executable steps, contained in program instructions described below, so as to control the computer system 302 to provide desired functionality.

Communication device 301 may be used to facilitate communication with, for example, other devices (such as sources of mobile device travel profile data and transaction data). For example, communication device 301 may comprise one or more communication ports (not separately shown), to allow the computer system 302 to communicate with other computers and other devices.

Input device 306 may comprise one or more of any type of peripheral device typically used to input data into a computer. For example, the input device 306 may include a keyboard and a mouse. Output device 308 may comprise, for example, a display and/or a printer.

Storage device 304 may comprise any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium or a memory.

Storage device 304 stores one or more programs for controlling processor 300. The programs comprise program instructions (which may be referred to as computer readable program code means) that contain processor-executable process steps of the computer system 302, executed by the processor 300 to cause the computer system 302 to function as described herein.

The programs may include one or more conventional operating systems (not shown) that control the processor 300 so as to manage and coordinate activities and sharing of resources in the computer system 302, and to serve as a host for application programs (described below) that run on the computer system 302.

The programs stored in the storage device 304 may also include, in some embodiments, a data preparation program 310 that controls the processor 300 to enable the computer system 302 to perform operations on data received by the computer system 302 to place the data in an appropriate condition for subsequent analysis and profile matching. For example, mobile device travel profile data may be translated into a standard format to facilitate detection of possible matches between mobile device travel profiles and transaction profiles.

Another program that may be stored in the storage device 304 is profile matching and scoring application program 312 that controls the processor 300 to enable the computer system 302 to perform analysis with respect to the profile data, to detect potential matches between mobile device travel profiles and transaction profiles and to calculate scores that may be applied to the potential matches to indicate the degree of confidence that the potential matches are correct. Other aspects of the profile matching and scoring application program 312 will be described below in connection with FIG. 4.

In addition, the storage device 304 may store an account linking application program 314 that controls the processor 300 to enable the computer system 302 to use the profile matches and confidence scores provided by the matching/scoring application program 312 to establish links between payment card accounts that have suitable matches with a common mobile device.

Still further, the storage device 304 may store an application program 316 that performs one or more analyses on collections of transaction data that correspond to payment card accounts that were linked to each other by the account linking application program 314.

The storage device 304 may also store, and the computer system 302 may also execute, other programs, which are not shown. For example, such programs may include e.g., communication software, a reporting program, a database management program, device drivers, etc.

The storage device 304 may also store one or more databases 318 required for operation of the computer system 302. Such databases, for example, may store at least temporarily the mobile device travel profiles and the transaction profiles to be analyzed and matched by the computer system 302. Such databases may also store combined data sets formed by aggregating transaction data from two or more linked payment card accounts.

Figure 4:
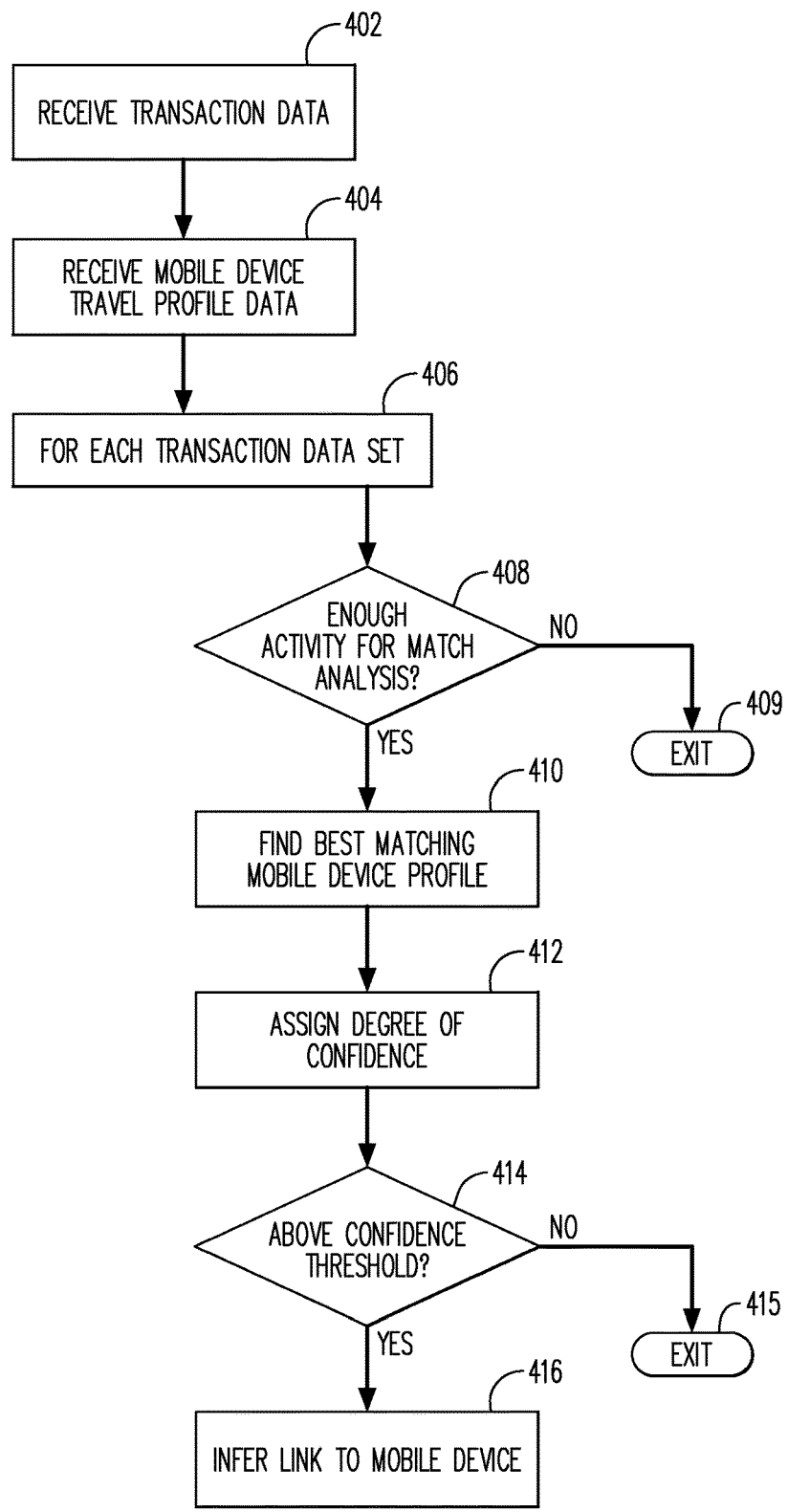
FIG. 4 is a flow chart that illustrates a process that may be performed in accordance with aspects of the present disclosure.

FIG. 4 is a flow chart that illustrates a process that may be performed in accordance with aspects of the present disclosure. At least some portions of the process of FIG. 4 may be performed by the computer system 302 under the control of the software programs referred to above.

At 402 in FIG. 4, the computer system 302 may receive transaction data that corresponds to payment card account transactions processed through a payment card system. The transaction data may include data sets that each represents transactions performed with respect to a particular payment card account. Each of the data sets may be considered a "profile" for the respective payment card account, and (at least for purposes of the process of FIG. 4) may have been filtered down to a set of combinations of merchant locations and dates/times at which the payment card in question was used for a transaction.

At 404 in FIG. 4, the computer system 302 may receive the above-mentioned mobile device travel profile data. The format of the geographic and temporal data elements of the mobile device travel profile data may depend on the manner in which such data was collected and/or may depend on the source of the data. The subsequent match processing stage may include data formatting and/or pre-processing to place the mobile device travel profile data in an appropriate state for potential matching with the transaction data sets.

Block 406 in FIG. 4 indicates that subsequent process steps shown in FIG. 4 may be performed with respect to each data set in the transaction data (i.e., with respect to the location/time profile for each payment card account reflected in the transaction data).

At decision block 408, the computer system 302 may determine, for the current transaction data set, whether the location/time profile it represents contains enough transactions and/or exhibits sufficient diversity in location and/or time to make it likely that a reliable match could be made between the current transaction data set and one of the mobile device travel profiles. If such is not the case, the process may conclude (reference numeral 409).

If a positive determination is made at decision block 408, then blocks 410 and 412 may follow decision block 408 with respect to the current transaction data set. At block 410, the computer system 302 applies a matching algorithm to determine to what extent the current transaction data set should be considered a match for each of the mobile device travel profiles received at 404. A number of different types of matching algorithms may be employed. For example, the matching algorithm may include a calculation of the mathematical distance between the set of location/time pairs contained in the current transaction data set and the set of location/time pairs contained in the mobile device travel profile that is currently under consideration. In addition or alternatively, the algorithm may involve calculating a spline of the geographic location data contained in one or both of the current transaction data set and the current mobile device travel profile.

In addition to or instead of the matching techniques referred to above, it is contemplated to use one or more of a considerable number of matching techniques, including one or more measurements of correlation, linear or logistic regression, variable reduction analysis, distance statistics, clustering analysis, and/or decision tree analysis. Other matching analysis techniques may also or alternatively be used.

As part of block 410, and based on the match algorithm or algorithms employed therein, the mobile device travel profile that best matches the current transaction data set is determined. Then, at 412, again based on the match algorithm or algorithms, a degree of confidence is determined as to the validity of the match between the current transaction data set and the mobile device travel profile that best matches the current transaction data set.

A decision block 414 may follow block 412. At decision block 414, the computer system 302 may determine whether the degree of confidence assigned at 412 exceeds a predetermined confidence level threshold. If so, then the match or link between the current transaction data set and the best matching mobile device travel profile may be deemed reliable or valid, as indicated at block 416. In other words, it is reasonable to conclude that the payment card account that corresponds to the current transaction data set is owned by the same individual who owns the mobile device that corresponds to the best matching mobile device travel profile. (If a negative determination is made at decision block 414, the process may conclude (reference numeral 415).)

Figure 5:
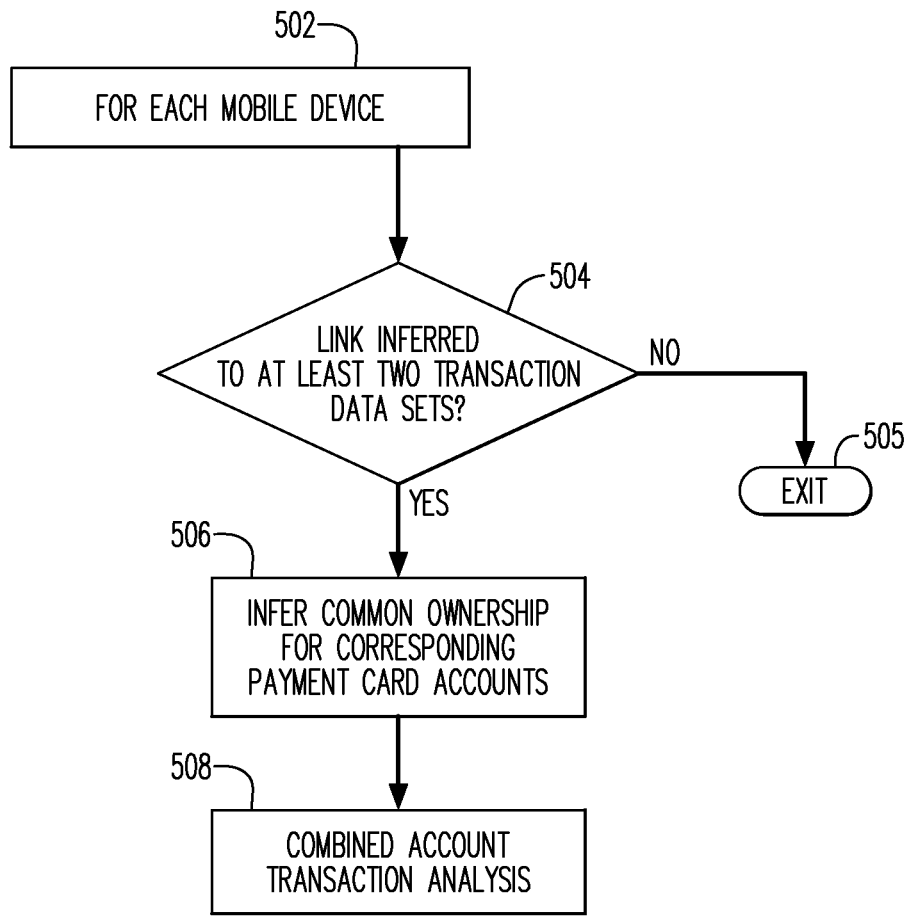
FIG. 5 is a flow chart that illustrates a further process that may be performed in accordance with aspects of the present disclosure.

FIG. 5 is a flow chart that illustrates a further process that may be performed by the computer system 302 in accordance with aspects of the present disclosure.

Block 502 in FIG. 5 indicates that the succeeding portions of the process of FIG. 5 may be performed in turn for each mobile device (i.e., for each mobile device travel profile) included in the data received at 404 in FIG. 4.

At decision block 504 in FIG. 5, the computer system 302 may determine whether—for the current mobile device/mobile device travel profile—previous executions of the process of FIG. 4 have indicated that two or more of the transaction data sets have been reliably linked to the mobile device in question. If so, then block 506 follows decision block 504. At block 506, the computer system 302 determines that the two or more transaction data sets, through their linkage to the same mobile device, may be considered reliably linked to each other. It is therefore deemed reasonable to infer that the payment card accounts that correspond to the transaction data sets in question are commonly owned. It further follows that it may be fruitful to combine the transaction data for the commonly owned payment card accounts for purposes of further analysis, as represented by block 508 in FIG. 5. (If a negative determination is made at decision block 504, the process may conclude (reference numeral 505).)

The inference of common ownership of the two (or more) payment card accounts, as made based on linkage of the two accounts to the same mobile device, may have a number of potential benefits. For example, if all of the transactions for one of the payment card accounts are later in time than the transactions for the other payment card account, it may be the case that one account was canceled and the other represents a reissuance of the same account relationship under a different payment card account number. Thus the inference of common ownership may facilitate an understanding of continuity in the cardholder's spending behavior.

In other situations, the inference of common ownership may facilitate an analytical overview of the cardholder's spending habits and/or may facilitate various ways of "drilling down" into that behavior.

For example, the transactions of both payment card accounts may be combined into a single data set, and may be augmented with data that indicates transaction amount, merchant identification, merchant category, etc., for the purposes of spending habit analysis. One type of analysis that could be performed on the combined data set could be a trend analysis to detect trends in the cardholder's payment card account spending.

In another possible type of analysis of the combined data set, the total amount spent using one of the payment card accounts may be compared with the total amount spent using the other one of the payment card accounts. This may be thought of as one type of "share of wallet" analysis.

"Share of wallet" is a term of art that is known to skilled practitioners in the field, and may also refer to other specific types of analyses. For example, another type of share-of-wallet analysis may examine what percentage of spending done by the cardholder in a particular merchant category occurs with a specific merchant in that category. For such an analysis, it would be advantageous to use a combined transaction data set encompassing two or more commonly owned payment card accounts, rather than just one payment card account.

Another type of analysis that may be performed is known by those skilled in the art as a "share of visits" analysis. As is well-known, share-of-visits analysis is based on the proportional number of transactions, rather than proportional total transaction amounts. Again, it may be advantageous to base such an analysis on a combined transaction data set for two (or more) commonly owned payment card accounts, rather than just on one payment card account.

Still another type of analysis that may be performed may gather and/or infer demographic characteristics of the cardholder based on his/her payment card account transactions. An example technique for such analysis is disclosed, for example, in U.S. Published Patent Application No. 2009/0192875 (which is commonly assigned herewith). Again it may be more effective to perform this type of analysis on the transactions in two or more commonly owned payment card accounts rather than just on transactions from one account.

According to yet another type of analysis, it may be determined, for the combined set of transactions, what proportion of the transactions occurred online (i.e., via e-commerce websites).

One advantage of the payment card account linking process described herein is that in some embodiments it may be performed without utilizing any personally identifiable information. In some embodiments, the analysis or analyses performed using the combined transaction data sets may be used to develop spending and/or demographic profiles for large or small groups of cardholders. In addition or alternatively, the analysis or analyses may be used to construct profiles of individual cardholders. In either case, the resulting profiles may be useful for increasing the effectiveness of marketing campaigns.

Although a number of "assumptions" are provided herein, the assumptions are provided as illustrative, but not limiting examples of one particular embodiment—those skilled in the art will appreciate that other embodiments may have different rules or assumptions.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

The flow charts and descriptions thereof herein should not be understood to prescribe a fixed order of performing the method steps described therein. Rather the method steps may be performed in any order that is practicable.

As used herein and in the appended claims, the term "payment card system account" includes a credit card account, a deposit account that the account holder may access using a debit card, a prepaid card account, or any other type of account from which payment transactions may be consummated. The terms "payment card system account" and "payment card account" are used interchangeably herein. The term "payment card account number" includes a number that identifies a payment card system account or a number carried by a payment card, or a number that is used to route a transaction in a payment system that handles debit card and/or credit card transactions. The term "payment card" includes a credit card, debit card, prepaid card, or other type of payment instrument, whether an actual physical card, virtual accounts or electronic wallets.

Although the present disclosure has been described in connection with specific exemplary embodiments, it should be understood that various changes, substitutions, and alterations apparent to those skilled in the art can be made to the disclosed embodiments without departing from the spirit and scope of the disclosure as set forth in the appended claims.

What is claimed is:

1. A computer-implemented method comprising:
receiving a plurality of payment data sets from a payment network, each of the plurality of payment data sets indicative of respective geographic locations and respective times a plurality of payment card transactions were made by a respective payment card at the respective geographic locations;
anonymizing the plurality of payment data sets, each anonymous payment data set associated with a respective non-identifiable payment card in which personally identifiable information has been removed and comprising the respective geographic locations and the respective times the plurality of payment card transactions were made by the respective non-identifiable payment card at the respective geographic locations;
receiving a plurality of mobile device data sets from a respective mobile device generated by one or more of: tracking by a mobile network operator of the respective mobile device, data uploaded from global positioning system applications in the respective mobile device location data generated in connection with social network applications of the respective mobile device, and data captured in connection with other location-sensitive services of the respective mobile device; wherein each mobile device data set of the plurality of mobile device data sets is associated with the respective mobile device and comprises a respective travel profile representing movements of the respective mobile device from one location to another over time, and the respective travel profile includes a number of data pairs which includes a respective geographic location and respective temporal data from when the respective mobile device was at the respective geographic location;
anonymizing the plurality of mobile device data sets, each anonymous mobile device data set associated with a respective non-identifiable mobile device in which personally identifiable information has been removed and comprising the device from one location to another over time, wherein the respective travel profile includes the number of data pairs which includes the respective geographic location and the respective temporal data from when the respective non-identifiable mobile device was at the respective geographic location;
determining, by an engine, that at least two non-identifiable payment cards from the plurality of anonymized payment data sets are commonly controlled by a common mobile device, the determining comprising separately linking a non-identifiable mobile device from the plurality of anonymized mobile data sets to the at least two non-identifiable payment cards based on the respective travel profile of the non-identifiable mobile device and the respective geographic locations and the respective times the plurality of payment card transactions were made in the respective geographic locations by the at least two non-identifiable payment cards; and
aggregating data, by the engine, from transactions performed by the at least two non-identifiable payment cards linked to the common mobile device and storing the aggregated data in a storage device such that the aggregated data is linked to the common control in the storage device.

2. The method of claim 1, further comprising generating a combined spending profile that comprises a comparison of total purchases made within the transactions associated with the at least two non-identifiable payment cards.

3. The method of claim 2, wherein the combined spending profile comprises a trend analysis of a total group of transactions that includes said transactions associated with the at least two non-identifiable payment cards.

4. The method of claim 2, wherein the combined spending profile comprises a demographic inference analysis of a total group of transactions that includes said transactions associated with the at least two non-identifiable payment cards.

5. The method of claim 2, wherein the combined spending profile comprises a share-of-wallet analysis based on a total group of transactions that includes said transactions associated with the at least two non-identifiable payment cards.

6. The method of claim 2, wherein the combined spending profile comprises a share-of-visits analysis based on a total group of transactions that includes said transactions associated with the at least two non-identifiable payment cards.

7. The method of claim 2, wherein the combined spending profile comprises an indicator of a proportion of online transactions relative to a total group of transactions that includes said transactions associated with the at least two non-identifiable payment cards.

8. The method of claim 1, wherein the determining comprises determining distances between points from movement of the respective travel profile and points of the movement of spending over time, and linking together the non-identifiable mobile device and the at least two non-identifiable payment cards based on the determined distances between the respective groups of points over time.

9. A non-transitory computer readable medium having program instructions stored thereon, the medium comprising:
instructions to receive a plurality of payment data sets from a payment network, each of the plurality of payment data sets indicative of respective geographic locations and respective times a plurality of payment card transactions were made by a respective payment card at the respective geographic locations;

instructions to anonymize the plurality of payment data sets, each anonymous payment data set associated with a respective non-identifiable payment card in which personally identifiable information has been removed and comprising the respective geographic locations and the respective times the plurality of payment card transactions were made by the respective non-identifiable payment card at the respective geographic locations;

instructions to receive a plurality of mobile device data sets from a respective mobile device generated by one or more of: tracking by a mobile network operator of the respective mobile device, data uploaded from global positioning system applications in the respective mobile device, location data generated in connection with social network applications of the respective mobile device, and data captured in connection with other location-sensitive services of the respective mobile device; wherein each mobile device data set of the plurality of mobile device data sets is associated with the respective mobile device and comprises a respective travel profile representing movements of the respective mobile device from one location to another over time, and the respective travel profile includes a number of data pairs which includes a respective geographic location and respective temporal data from when the respective mobile device was at the respective geographic location;

instructions to anonymize the plurality of mobile device data sets, each anonymous mobile device data set associated with a respective non-identifiable mobile device in which personally identifiable information has been removed and comprising the respective travel profile representing movements of the respective non-identifiable mobile device from one location to another over time, wherein the respective travel profile includes the number of data pairs which includes the respective geographic location and the respective temporal data from when the respective non-identifiable mobile device was at the respective geographic location;

instructions to determine that at least two non-identifiable payment cards from the plurality of anonymized payment data sets are commonly controlled by a common mobile device from the plurality of anonymized mobile data sets, the determining comprising separately linking a non-identifiable mobile device from the plurality of anonymized mobile data sets to the at least two non-identifiable payment cards based on the respective travel profile of the non-identifiable mobile device and the respective geographic locations and the respective times the plurality of payment card transactions were made in the respective geographic locations by the at least two non-identifiable payment cards; and instructions to aggregate data from transactions performed by the at least two non-identifiable payment cards linked to the common control and storing the aggregated data in a storage device such that the aggregated data is linked to the common mobile device in the storage device.

10. The medium of claim 9, wherein the medium further comprises instructions for generating a combined spending profile comprises a comparison of total purchases made within the transactions associated with the at least two non-identifiable payment cards.

11. The medium of claim 10, wherein the combined spending profile comprises a trend analysis of a total group of transactions that includes said transactions associated with the at least two non-identifiable payment cards.

12. The medium of claim 10, wherein the combined spending profile comprises a demographic inference analysis of a total group of transactions that includes said transactions associated with the at least two non-identifiable payment cards.

13. The medium of claim 10, wherein the combined spending profile comprises a share-of-wallet analysis based on a total group of transactions that includes said transactions associated with the at least two non-identifiable payment cards.

14. The medium of claim 10, wherein the combined spending profile comprises a share-of-visits analysis based on a total group of transactions that includes said transactions associated with the at least two non-identifiable payment cards.

15. The medium of claim 10, wherein the combined spending profile comprises an indicator of a proportion of online transactions relative to a total group of transactions that includes said transactions associated with the at least non-identifiable two payment cards.

16. An apparatus comprising:

a processor; and a memory in communication with said processor and storing program instructions, said processor operative with the program instructions to perform functions as follows:

receiving a plurality of payment data sets from a payment network, each of the plurality of payment data sets indicative of respective geographic locations and respective times a plurality of payment card transactions were made by a respective payment card at the respective geographic locations;

anonymizing the plurality of payment data sets, each anonymous payment data set associated with a respective non-identifiable payment card in which personally identifiable information has been removed and comprising the respective geographic locations and the respective times the plurality of payment card transactions were made by the respective non-identifiable payment card at the respective geographic locations;

receiving a plurality of mobile device data sets from a respective mobile device generated by one or more of: tracking by a mobile network operator of the respective mobile device, data uploaded from global positioning system applications in the respective mobile device, location data generated in connection with social network applications of the respective mobile device, and data captured in connection with other location-sensitive services of the respective mobile device; wherein each mobile device data set of the plurality of mobile device data sets is associated with the respective mobile device and comprises a respective travel profile representing movements of the respective mobile device from one location to another over time, and the respective travel profile includes a number of data pairs which includes a respective geographic location and respective temporal data from when the respective mobile device was at the respective geographic location;

anonymizing the plurality of mobile device data sets, each anonymous mobile device data set associated with a respective non-identifiable mobile device in which personally identifiable information has been removed and comprising the respective travel profile representing movements of the respective non-identifiable mobile device from one location to another over time, wherein the respective travel profile includes the number of data pairs which includes the respective geographic location and the respective temporal data from when the respective non-identifiable mobile device was at the respective geographic location;

determining, by the processor, that at least two non-identifiable payment cards from the plurality of anonymized payment data sets are commonly controlled by a common mobile device, the determining comprising separately linking a non-identifiable mobile device from the plurality of anonymized mobile data sets to the at least two non-identifiable payment cards based on the respective travel profile of the non-identifiable mobile device and the respective geographic locations and the respective times the plurality of payment card transactions were made in the respective geographic locations by the at least two non-identifiable payment cards; and aggregating data, by the processor, from transactions performed by the at least two non-identifiable payment cards linked to the common mobile device and storing the aggregated data in a storage device such that the aggregated data is linked to the common control in the storage device.

17. The apparatus of claim 16, wherein the processor is further configured to generate a combined spending profile comprises a comparison of total purchases made within the transactions associated with the at least two non-identifiable payment cards.

18. The apparatus of claim 17, wherein the combined spending profile comprises a trend analysis of a total group of transactions that includes said transactions associated with the at least two non-identifiable payment cards.

19. The apparatus of claim 17, wherein the combined spending profile comprises a demographic inference analysis of a total group of transactions that includes said transactions associated with the at least two non-identifiable payment cards.

20. The apparatus of claim 17, wherein the combined spending profile comprises a share-of-wallet analysis based on a total group of transactions that includes said transactions associated with the at least two non-identifiable payment cards.

21. The apparatus of claim 17, wherein the combined spending profile comprises a share-of-visits analysis based on a total group of transactions that includes said transactions associated with the at least two non-identifiable payment cards.

* * * * *